Aug. 17, 1926.  1,596,742
P. KRUSE
MACHINE FOR MAKING CAN BODIES OR THE LIKE
Filed Dec. 12, 1925    3 Sheets-Sheet 2
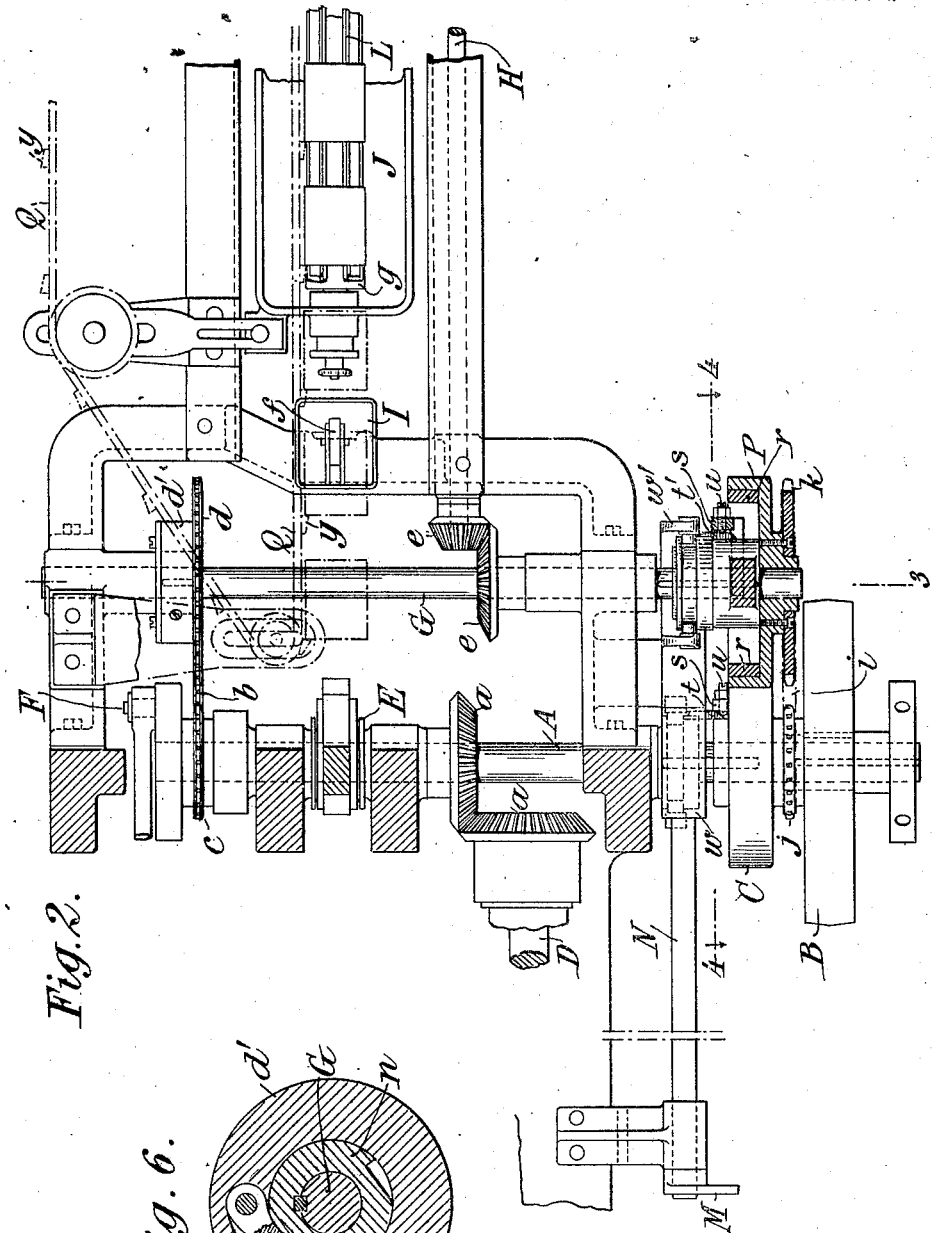
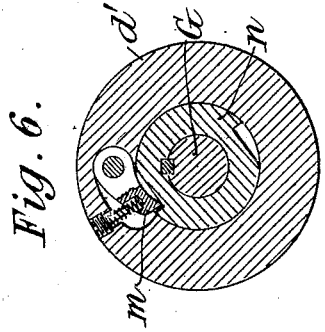
INVENTOR
Peter Kruse,
By Attorneys,
Fraser, Myers & Manley Aug. 17, 1926. 1,596,742
P. KRUSE
MACHINE FOR MAKING CAN BODIES OR THE LIKE
Filed Dec. 12, 1925 3 Sheets-Sheet 3

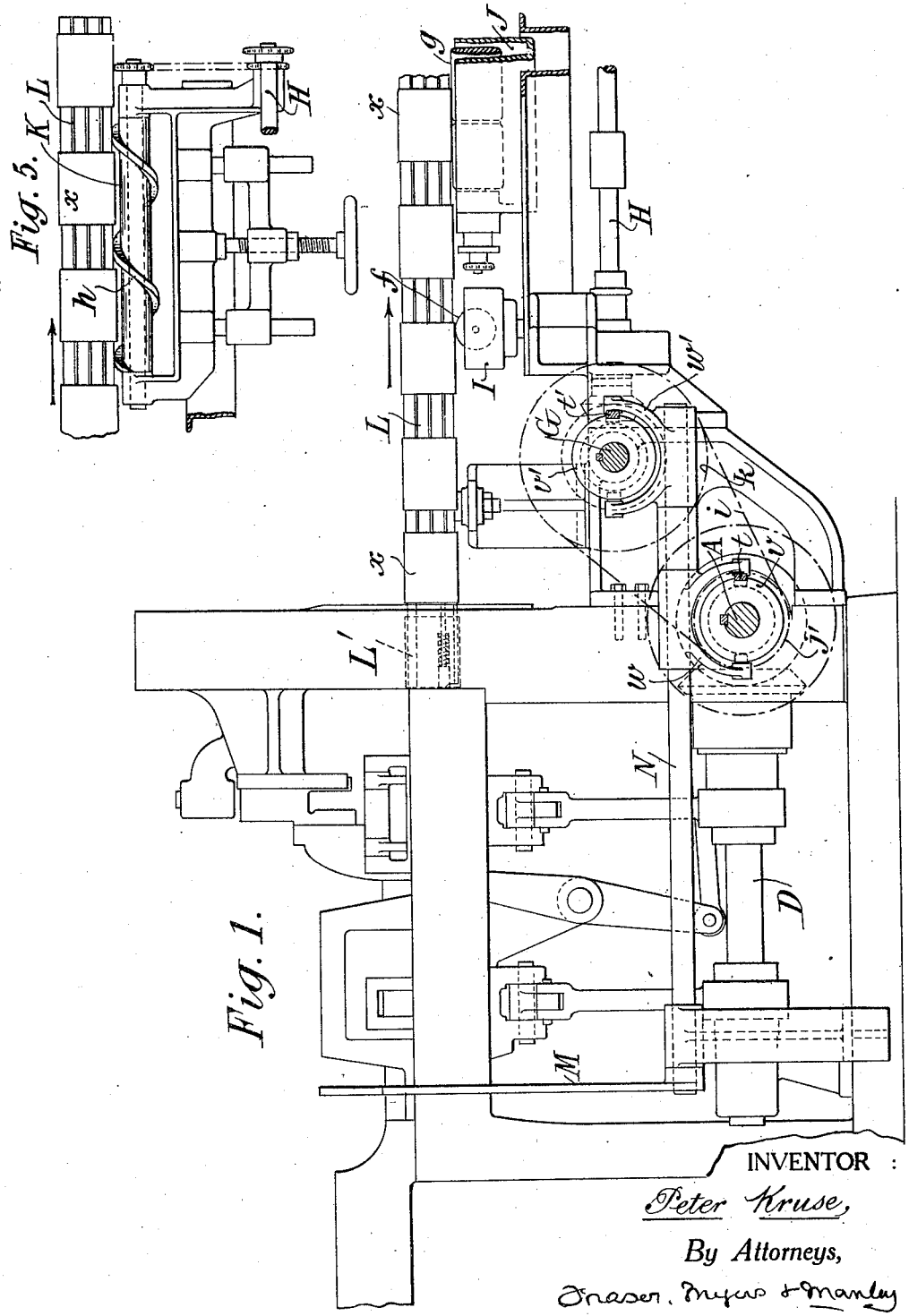

INVENTOR:
Peter Kruse,
By Attorneys,
Fraser, Myers + Manley

Patented Aug. 17, 1926.

1,596,742

UNITED STATES PATENT OFFICE.

PETER KRUSE, OF BROOKLYN, NEW YORK, ASSIGNOR, BY MESNE ASSIGNMENTS, TO E. W. BLISS COMPANY, OF NEW YORK, N. Y., A CORPORATION OF DELAWARE.

MACHINE FOR MAKING CAN BODIES OR THE LIKE.

Application filed December 12, 1925. Serial No. 75,102.

This invention relates to machines for forming sheet-metal into tubes and for soldering or otherwise uniting the side seam. Such machines are commonly used in the making of can bodies, the opposite edges of the metal being brought together and lock-seamed, and the seam then passed to soldering apparatus which solders the seam.

In such machines a horn or mandrel is used, around which the sheet-metal body is bent and seamed, and on a prolongation or extension of such horn or mandrel the successive bodies are fed along and the seam is passed successively into contact with acid-ing or fluxing means and solder-applying means, after which the body is carried on the horn extension long enough to permit the solder to cool and set. The soldering parts and the can-making parts have to be correctly synchronized, for which purpose both are driven from one common driving mechanism. On stopping the machine provision has to be made for continuing the operation of the soldering mechanism until the bodies already formed are soldered and fed out, as otherwise the soldering mechanism would stop with the bodies in any position they might happen to be, with the consequent liability of spoiling some of the unsoldered or partly soldered bodies. The present invention provides new means for accomplishing such separate driving of the soldering mechanism, and later its re-connection with the body-making mechanism, whereby to resume the concurrent operation of the two mechanisms with their elements working together in correct synchronism.

As the speed of body-making and soldering machines has increased, greater difficulty has been encountered in providing for the independent operation of the soldering mechanism after the stoppage of the body-making operation and for the subsequent re-connection of the two mechanisms, because in order to bring them into correctly timed relation reliance has been had on positively-acting clutches which couple the mechanisms to the driving means at a definite point in the rotation by positive locking action which operates well at the lower speeds, but at high speeds subjects the mechanism to undesirably severe shocks. To avoid such shocks it is desirable to substitute friction clutch means, whereby the parts of the machine may be started with an easy acceleration and without shock; but this involves difficulty in connecting the respective mechanisms in properly timed relation. Their correct timing is essential to insure that the can bodies shall be properly fed from the body making mechanism to the soldering mechanism without danger of injuring or distorting them. The present invention provides for such connection between the respective mechanisms, when driven through friction clutches, as will permit of their being driven independently while insuring that when driven together they shall be coupled together in correct synchronism, and permitting of high speed operation.

The preferred embodiment of the invention is shown in the accompanying drawings, wherein—

Figure 1 is a side elevation of the machine partly in section, on the line 1—1 in Fig. 2;

Fig. 2 is a fragmentary plan partly in horizontal section;

Fig. 5 is an elevation of part of the soldering mechanism, being supplemental to Fig. 1;

Fig. 6 is an enlarged transverse section through the hub $d'$, looking in the same direction as Fig 1.

Figure 4:
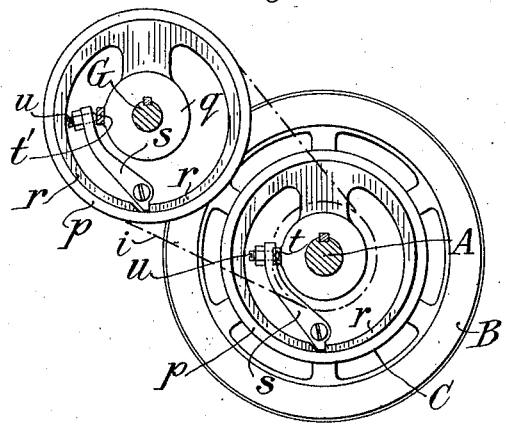
Fig. 4 is a fragmentary section on the line 4—4 in Fig. 2, looking in the opposite direction to Fig. 1.

The particular construction of body-forming machine in connection with which the present invention is illustrated, is set forth in Patents No. 1,246,437, dated November 13, 1917, and No. 1,430,743, dated October 3, 1922. Only so much of the machine is here shown as is necessary to make the present invention clear.

Referring to the drawings the drive shaft A, shown as extending transversely of the machine, receives power from any suitable source such as a pulley B turning loosely on the shaft and driving it through a clutch C. The body-forming mechanism is driven from the shaft A. Part of this mechanism is driven in the customary manner from a shaft D which is geared by miter gears $a$, $a$ to the shaft A. Other parts of the mechanism are driven directly from the shaft A, as, for example, by an eccentric E and a crank F which may drive respectively any appropriate parts of the body-forming mechanism.

A shaft G, shown as arranged parallel with the shaft A, is normally driven from it, this being conveniently accomplished by means of a chain $b$ between sprockets $c$, $d$ on the respective shafts. The shaft G, through bevel gears $e$, $e$, drives a shaft H which is the driving shaft of the soldering mechanism. The soldering mechanism includes any usual acid pot or flux-applying means such as the pot I, in which turns an acid-applying roll $f$. It also includes means for applying solder, such as a solder pot J in which turn soldering rolls $g$. It also includes any suitable means for feeding the can bodies and for supporting the horn extension. The latter means may be such, for example, as shown in Patent No. 1,317,929, dated October 7, 1919, or it may be a revolving spiral support such as shown in Patent No. 1,333,550, dated March 9, 1920. A fragment of the latter construction is shown in Fig. 5, where K is a revolving shaft turning in suitable bearings and having a spiral rib $h$. The shaft K is driven through sprocket chains or any other convenient way from the shaft H. Its speed and the pitch of the spiral rib are such that the latter supports the horn at points between the can bodies, and these points of support travel along beneath the horn at the same speed as the feed of the can bodies.

The horn as a whole is lettered L. It comprises, as usual, a portion L' around which the sheet-metal blank is wrapped, and against which its edge flanges or hooks are united to form the side seam, these parts being of usual and well understood construction, and not being lettered. The remainder of the horn L, sometimes called the horn extension, projects beyond the body-forming mechanism over the soldering mechanism. This portion of the horn or extension is commonly made of skeleton form to reduce weight, and is guided and supported in any suitable way, perferably in the manner already described.

The clutch C, by which the constantly running pulley B is coupled to or uncoupled from the shaft A, is operated by a suitable handle or lever M. When engaged, the shaft A and its entrained parts of the body-forming mechanism are operating, and the machine being suitably fed with blanks, these are successively formed into bodies, one body being formed to each rotation of the shaft A. The shaft H and its connected parts are driven, as described, from the shaft A through the shaft G, and the soldering mechanism operates thus in proper synchronism with the body-forming mechanism.

For continuing the drive of the soldering mechanism after the stoppage of the body-forming mechanism, the shaft G is provided with a clutch P, the continuously rotating member of which receives its drive directly or indirectly from the pulley B (as by a chain $i$ connecting clutch C through sprocket wheels $j$, $k$), this driving connection being of the same ratio as that afforded by the chain $b$ and sprockets $c$, $d$. The clutch lever M is so connected to the two clutches as to engage them alternately; that is to say, when clutch C is engaged to drive the shaft A, clutch P is disengaged, so that the shaft G is driven through the chain $b$; when, on the contrary, the lever is thrown to disengage clutch C, it engages clutch P, so that the shaft A, being no longer driven, stops, and the shaft G and the soldering mechanism are now driven from the clutch P, and at the same speed as before. To permit of this drive of the shaft G independently of the chain $b$, a slip connection or ratchet is introduced at any suitable point, whereby when the chain $b$, and sprockets $c$, $d$ are stationary, the shaft G may nevertheless revolve in its customary direction. The soldering mechanism will continue to operate alone so long as the clutch P remains engaged; when the can bodies have all been soldered and fed out, the operator will throw out the clutch P and the soldering mechanism will stop, thus leaving the entire machine stationary.

Figure 3:
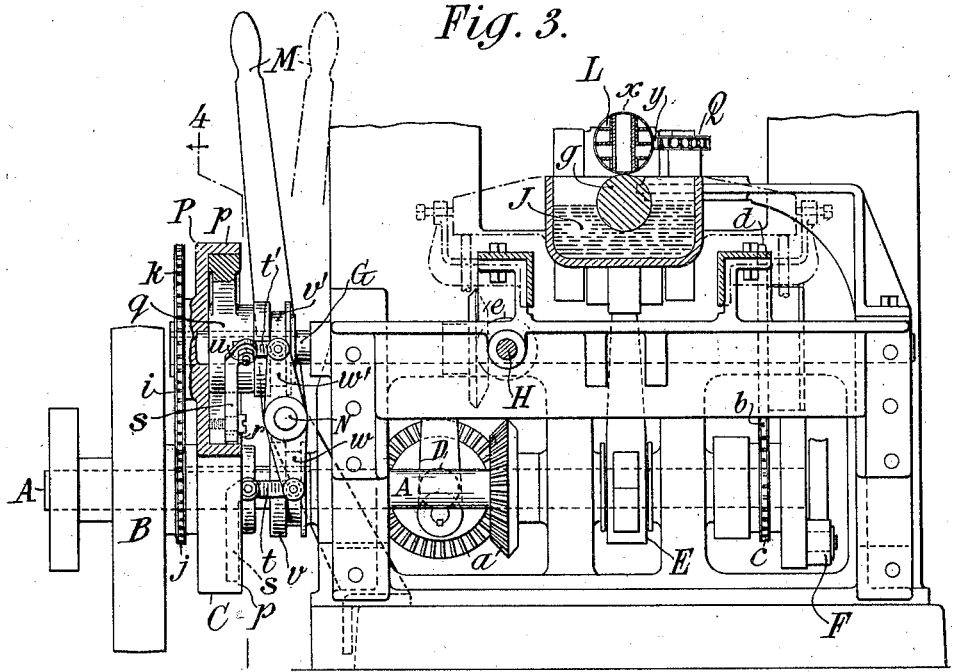
Fig. 3 is a sectional elevation, the section being in the plane of the line 3—3 in Fig. 2, and the view looking from the discharging end of the machine.

When it is desired to start the machine again, the two mechanisms should be started together or in close succession, and in step with one another, so that the feed of the soldering mechanism shall synchronize with the feed of the can body blanks to, and of the can bodies from, the body-forming horn. Thus, as the formed bodies are fed off from the horn they should be picked up by the feeding means of the soldering mechanism, an example of which is shown in dotted lines in Fig. 2, where Q is an endless chain turning over suitable pulleys and extending parallel with and alongside of the horn extension L, and having suitably spaced toes $y$ for engaging behind the can bodies and pushing them along on the horn extension. The position of this feeding chain is also shown in Fig. 3. Other feeding means may of course be substituted. Whatever the feeding means, it and the horn-supporting means (such as that shown in Fig. 5) must be correctly timed with the body-forming feed. To insure this timing it is requisite when the machine is re-started, to cause the soldering mechanism drive-shaft H to turn in exact relation to the shafts A and D which time the elements of the body-forming mechanism. For this purpose at any convenient point between these latter shafts and the shaft H is located a suitable pick-up device which is most simply and conveniently constructed as a ratchet and pawl of, for example, the structure shown in Fig. 6. This is conveniently located in the hub $d'$ of the sprocket wheel $d$, and between this and an inner hub or collar $n$ keyed on the shaft G, which in turn drives the shaft H. In the construction shown the spring pawl $m$ carried in the hub $d'$ may engage with either of two notches in the collar $n$, the latter thus constituting a ratchet wheel. The location of these notches is in correct angular relation with the positions of the feed toes $y$ with respect to the can bodies. It results from this construction that after the stoppage of the entire machine and upon the starting by engaging the clutch C of the body-forming mechanism, the latter drives through the chain $b$ the sprocket wheel $d$ and its hub $d'$ and pawl $m$; these turn freely, leaving the soldering mechanism stationary, until the pawl $m$ encounters the first of the notches in the collar $n$, whereupon it enters this notch and begins to drive the shaft G and consequently the shaft H and the feeding chain Q which is driven from the shaft H; and does this with the feeding means of the soldering mechanism in correct step with the feeding off of the can bodies from the horn on which they are locked. The ratchet and pawl device thus shown is a very simple and suitable means for accomplishing the re-coupling of the two mechanisms in correct timing; but obviously other interacting means in the nature of mechanical movements may be provided, it being only essential that some positive means be arranged to lock together the respective mechanisms in correct timing relation, which shall permit of the driving of the body-forming mechanism from a friction clutch, whereby it may be started slowly so as to avoid shock. By these means the speed of the machine has been raised to where it delivers 250 or more can bodies per minute, and without subjecting the mechanism to any injurious shock in starting.

The two positions of the clutch control lever M are shown in Fig. 3. The construction and adjustment of the clutches should be such that by moving this lever to an intermediate position neither clutch will be engaged, in order to wholly stop the machine. Thus, in the dotted line position the entire machine is driven through clutch C; by throwing the lever to the opposite position shown in full lines, clutch C is released and clutch P is engaged, so that the body-making mechanism is stopped and the soldering mechanism continues running; after this has gone far enough to feed all the cans through the soldering mechanism and out of the machine, the lever may then be thrown to the intermediate position, whereby the soldering mechanism is also stopped.

The friction clutches may be variously constructed. A suitable construction of a well-known type is shown in the drawings, especially in Fig. 4. Each clutch comprises a drum $p$, which is the driving member, and an inner or driven member $q$ which is keyed to the shaft to be driven and has an outer expansible rim $r$ split at one point and there engaged by the short arm of a lever $s$, the long arm of which has an adjusting screw which is engaged by a wedge $t$ for the clutch C, or $t'$ for the clutch P. These wedges have their wedging faces on the end portions only, and these faces engage the adjusting screw $u$ in the end of the corresponding lever $s$, so that when the wedge is thrust in it throws out the long arm of the lever and causes the short arm to expand the portion $r$ within the drum and thereby frictionally unite the two members of the clutch. This is a well-known construction of clutch which is very suitable for use in the present machine. The wedges $t$, $t'$ revolve with the driven member of the clutch and are mounted on and project from revolving slidable sleeves $v$, $v'$ which are engaged respectively by fork arms $w$, $w'$ projecting from opposite sides of a rock shaft N which is turned by the operating lever M. The alternate action of the clutches is due to the fact that these fork arms project one above and the other below the shaft N, so that they work in opposite directions.

The invention may receive various other embodiments within the scope of the appended claims.

I claim as my invention:—

1. In a machine for forming and soldering tubular bodies, the combination with body-forming mechanism and soldering mechanism, and driving means adapted normally to drive both, of frictionally-engaging clutch means for disconnecting the body-forming drive while continuing the soldering drive, and means independent of the clutch means adapted on the re-starting of the machine to connect both mechanisms in properly timed relation.

2. In a machine according to claim 1, the clutch means comprising two friction clutches for driving the respective mechanisms and oppositely-acting control mechanism for engaging the clutches alternately.

3. In a machine according to claim 1, friction clutch means for driving the body-forming mechanism adapted to start the machine gradually and without shock.

4. In a machine according to claim 1, the means for connecting the mechanisms in timed relation comprising a driving connection, whereby the soldering mechanism is normally driven from the body-forming mechanism.

5. In a machine according to claim 1, the means for connecting the mechanisms in timed relation consisting of a positive lock through which the soldering mechanism is driven from the body-forming mechanism.

6. In a machine for forming and soldering tubular bodies, the combination with body-forming mechanism and soldering mechanism, and friction clutches for driving the respective mechanisms, of a positive drive connection between said mechanisms independent of said clutches for driving the soldering mechanism in correct synchronism with the body-forming mechanism in normal running.

7. In a machine for forming and soldering tubular bodies, the combination with body-forming mechanism and soldering mechanism, the former including a drive shaft and clutch, and the latter including a drive shaft normally driven from said first-named shaft, and a clutch for driving said last-named shaft when the first-named clutch is released, and one-way drive means through which said second shaft is normally driven from the first shaft in timed relation, adapted to permit said second shaft to be independently driven when the first-named shaft is stopped.

In witness whereof, I have hereunto signed my name.

PETER KRUSE.